Feb. 6, 1934.    Z. J. KEGL    1,946,215
SOUND RECORDING
Filed Jan. 5, 1932
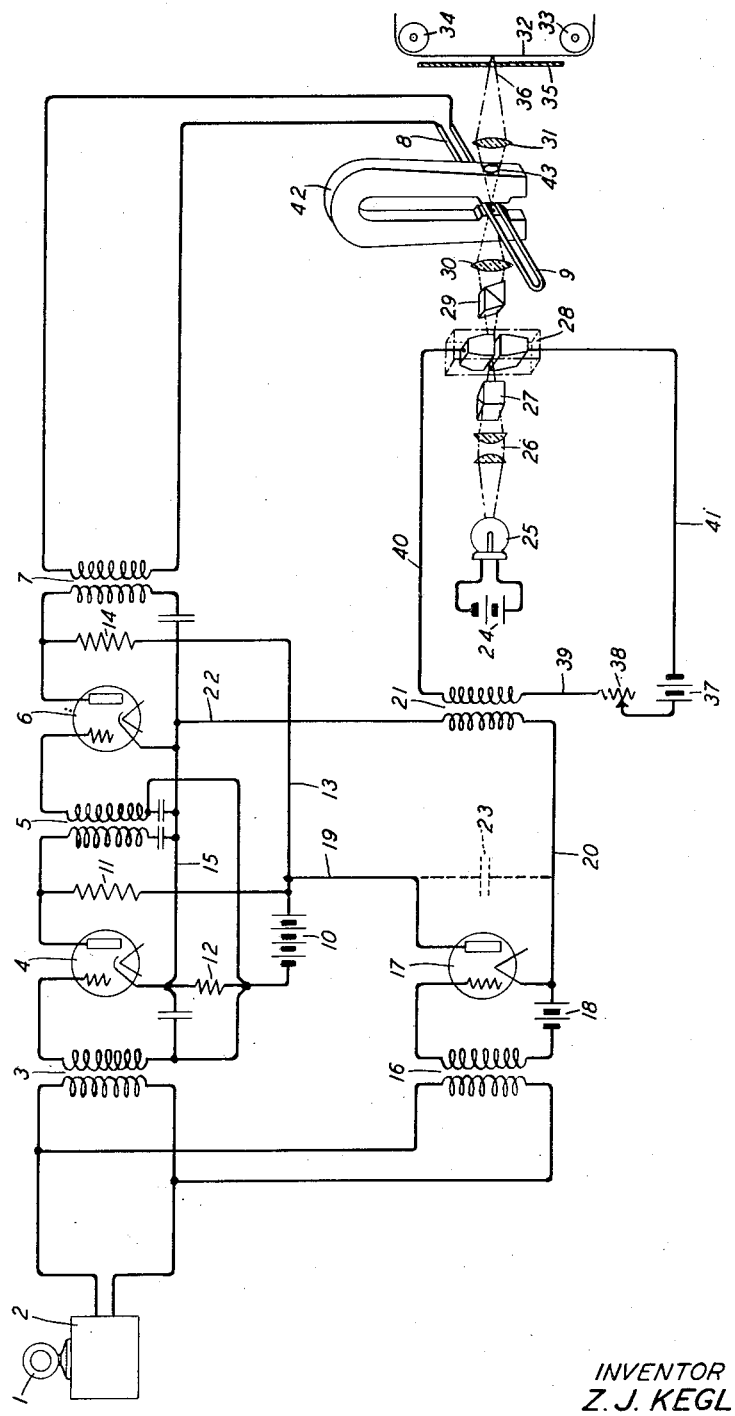
INVENTOR
Z. J. KEGL
BY
G. H. Heydt.
ATTORNEY Patented Feb. 6, 1934

1,946,215

UNITED STATES PATENT OFFICE 1,946,215

SOUND RECORDING

Zoltan J. Kegl, Hollywood, Calif., assignor to Electrical Research Products, Inc., New York, N. Y., a corporation of Delaware Application January 5, 1932. Serial No. 584,775

1 Claim. (Cl. 179—100.3)

This invention relates to sound recording and particularly to a method of recording sound by photographic means whereby the volume of noise produced by irregularities in the sound record is materially reduced.

A feature of the invention is a method of recording sound in which for a given frequency the time of exposure of the negative sound record is constant, but the intensity of the light incident on the film is varied directly with the envelope of the volume variations of the sound and the light incident on the film is modulated to a substantially constant degree for all volumes of sound.

Another feature of the invention resides in the use of polarized light for producing the photographic impression and the control of the intensity of the polarized light by electrically rotating the plane of polarization of the light in accordance with the envelope of the volume variations of the sound being recorded.

Recent experiments have shown that the amplitude of the currents which produce noise during the reproduction of a film sound record is approximately proportional to the average transmission of the positive sound record. Thus, if the average transmission of the positive sound record is at all times as small as possible, the noise produced will be a minimum. It may be shown, however, that the volume of the reproduced sound is proportional to the product of the average transmission of the positive sound record multiplied by the percentage change in the average transmission due to the record of the sound. Thus, in order to avoid distortion of the volume of sound when the average transmission of the positive sound record is reduced, the percentage change in the transmission must be inversely increased. The noise produced will be a minimum, and no distortion of the volume will be produced, if the change in transmission for all volumes is as large as possible and the average transmission is correspondingly small. The transmission of a photographic medium is defined as the ratio of the light transmitted through the medium divided by the light incident on the medium.

Assuming that the photographic processes are controlled so that the overall contrast is unity, the transmission of the positive sound record is proportional to the exposure of the negative sound record. The exposure of any negative is known to be proportional to the intensity of the recording light multiplied by the time of exposure. Thus, if the intensity of the recording light is small for small volumes of sound and increases in proportion with the increase in the volume of sound, the transmission of the resulting positive print will at all times be a minimum.

In the present invention, the light from the recording lamp is plane polarized by suitable means such as a Nicol polarizer. The polarized light is then passed through a suitable analyzer, such as a second Nicol prism, which is adjusted so that in the absence of sound, the light is substantially extinguished. A suitable transparent medium is interposed between the polarizer and the analyzer, and by electrical means, the plane of polarization of the light passing through the medium is rotated to cause the light emerging from the analyzer to vary in accordance with the volume of sound. The rotation of the plane of polarization of the light may be caused by a magnetic field, as in the Faraday cell, or an electric field, as in the Kerr or Karolus cell. The time of response of the controlling circuit is adjusted so that the light emerging from the analyzer preferably varies with the envelope of the volume variations of the sound and not with the instantaneous variations in the sound.

The light is modulated by a second light valve in accordance with the frequency characteristics of the sound being recorded. In the present invention the gain of the amplifier supplying energy to the second light valve is automatically varied so that the power supplied to the light valve is substantially constant for all volumes of sound. To produce this result the gain of the amplifier must be varied inversely with the volume of the sound recorded. The second light valve will then produce a constant percentage of change in the light incident on the film. The second light valve may be of any suitable type such as the light valve disclosed in U. S. Patent 1,638,555 granted August 9, 1927 to E. C. Wente, and may operate on the light entering the polarizing valve or on the light emerging from the analyzer.

The drawing illustrates in diagrammatic form a preferred embodiment of the invention.

Acoustic waves are detected by the microphone 1, and the resulting electric currents, after being amplified in a suitable amplifier 2, are supplied through a transformer 3 to the amplifying device 4. The amplified output of the device 4 is supplied through a transformer 5 to an amplifying device 6. The output of the device 6 is supplied through a transformer 7 to the ribbons 8, 9 of a light valve, which may be of the type disclosed in U. S. Patent 1,638,555 granted August 9, 1927 to E. C. Wente. The amplifying devices 4 and 6 have, for convenience, been disclosed as thermionic triodes, but it is apparent that other forms of amplifying devices may be used and that any suitable type of coupling may be used in place of the transformer coupling shown.

The heater units of the amplifying devices 4 and 6 may be supplied with current from any suitable source.

Current from a battery 10 flows through resistor 11 to the anode of device 4, through the device to its cathode and thence, through resistor 12, to the battery 10.

Current also flows from battery 10 through wire 13 and resistor 14 to the anode of device 6, through the device to its cathode, thence through wire 15 and resistor 12 to battery 10.

The combined currents flowing in the resistor 12 will produce a difference of potential between the ends of the resistor. This difference of potential will cause the control electrodes of the amplifying devices 4 and 6 to be at a negative potential with respect to their respective cathodes.

A portion of the output of the amplifier 2 is supplied through a transformer 16 to a detecting device 17, which for convenience has been shown as a thermionic triode. It will be apparent that other rectifying devices, such, for example, as a mercury rectifier or copper-copper oxide couple may be used as detecting devices. A battery 18 maintains the control electrode at a suitable negative potential with respect to the cathode of the detecting device 17 to produce efficient detection. The cathode may be heated in any known manner.

Current flows from the battery 10, through wire 19 to the anode of the detecting device 17, through device 17 to its cathode, thence through wire 20, primary winding of transformer 21, wire 22, wire 15 and resistor 12 to battery 10. The current flowing in the above circuit will increase with an increase in the amplitude of the modulated currents supplied to the detecting device 17. This increase in the current flowing in the resistor 12 causes an increase in the negative potential applied to the control electrodes of the amplifying devices 4 and 6 and thus reduces the gain of the amplifying devices.

A capacitor 23 may be connected in parallel relation to the output circuit of the detecting device 17. The capacitance of the capacitor 23 combined with the inductance of the primary winding of the transformer 21 and the resistance in the circuit form a network which smooths out the variations in the detected current. By suitably proportioning the elments of the circuit, the detected current, and the gain of the amplifying devices 4 and 6 may be caused to vary only with the envelope of the amplitude variations of the modulated currents and not with the instantaneous variations in the amplitude of the modulated currents.

Current from a battery 24 is supplied to a suitable source of light 25, which may, for example, be an incandescent electric lamp. Light of constant intensity from the source 25 is condensed by a lens system 26 on a polarizing device 27, such as a known form of Nicol prism. The polarized light passes through a control device 28 to an analyzing device 29, which may also be a Nicol prism. The light emerging from the analyzing device 29 is condensed by a lens system 30 on the ribbons 8, 9 of the light valve. The light passing between the ribbons 8, 9 is focussed by a lens system 31 on a photographic film 32 moved at constant speed by the sprockets 33, 34 in the known manner. An opaque screen 35 pierced by a small slotted aperture 26 limits the size of the impression produced on the film and reduces distortion caused by diffraction or dispersion of the light.

The light from the source 25 will be plane polarized by the polarizing device 27. The control device 28 may be a Faraday or Kerr cell in which the light passes through some suitable substance, such as carbon bisulphide. The plane of polarization of the light passing through the device 28 may be rotated by an electrostatic field as shown, or by an electromagnetic field. The rotation of the plane of polarization causes the intensity of the light passing through the analyzing device 29 to vary in accordance with the variation of the field.

A battery 37 and variable resistor 38 supply a controllable voltage or current bias to the control device 28, through wire 39, secondary winding of transformer 21, wire 40, device 28, and wire 41. The voltage or current supplied to the device 28 is varied by the voltage induced in the secondary winding of transformer 21 by the detected current flowing in the primary winding of transformer 21.

The analyzing device 29 is adjusted so that, in the absence of sound modulated currents, the light falling on the ribbons 8, 9 is a minimum. Preferably, the minimum light is adjusted to produce an exposure of the film 32 which is at the lower end of the region of correct exposure. The voltage induced in the secondary winding of the transformer 21 causes the device 28 to rotate the plane of polarization of the light thus causing the intensity of the light falling on the ribbons 8, 9 to increase. Due to the filtering action of the capacitor 23 and transformer 21, the intensity of the light increases in accordance with the envelope of the amplitude variations of the sound modulated currents.

The gain of the amplifying devices 4 and 6 is varied inversely with the envelope of the amplitude variations of the modulated currents by the current from the detector 17 flowing in resistor 12. The current supplied to the ribbons 8, 9 will thus be approximately constant for all amplitudes. The ribbons 8, 9 are immersed in a constant magnetic field from the magnet 42. Due to the reaction between the constant field of the magnet 42 and the magnetic field due to the current flowing in the ribbons 8, 9, the ribbons 8, 9 will vibrate with an approximately constant amplitude and at the frequency of the applied sound modulated currents. The amplitude of swing is adjusted to produce substantially complete modulation of the light passing through the orifice 43 pierced in the poles of the magnet 42.

What is claimed is:

In a sound recording system, a recording lamp, a moving film, two light valves in cascade interposed between the lamp and the film, the first valve having a polarizing prism, an analyzing prism and an optical medium between said prisms, the second valve having an element movable in the direction of movement of said film, a source of modulated waves, an amplifier connected to said source, means for supplying the output of said amplifier to actuate the second valve, a control circuit connected to said source to rotate the plane of polarization of the light transmitted through said medium directly in accordance with the envelope of the amplitude variations of said waves and simultaneously to regulate the amplification of said amplifier inversely in accordance with the envelope of the amplitude variations of said waves.

ZOLTAN J. KEGL.